2,995,250
OIL FILTER
Howard L. Boewe and Howard H. Gaither, West Salem, Ill., assignors to Champion Laboratories, Inc., West Salem, Ill., a corporation of Connecticut
Filed Jan. 26, 1959, Ser. No. 789,095
1 Claim. (Cl. 210—130)

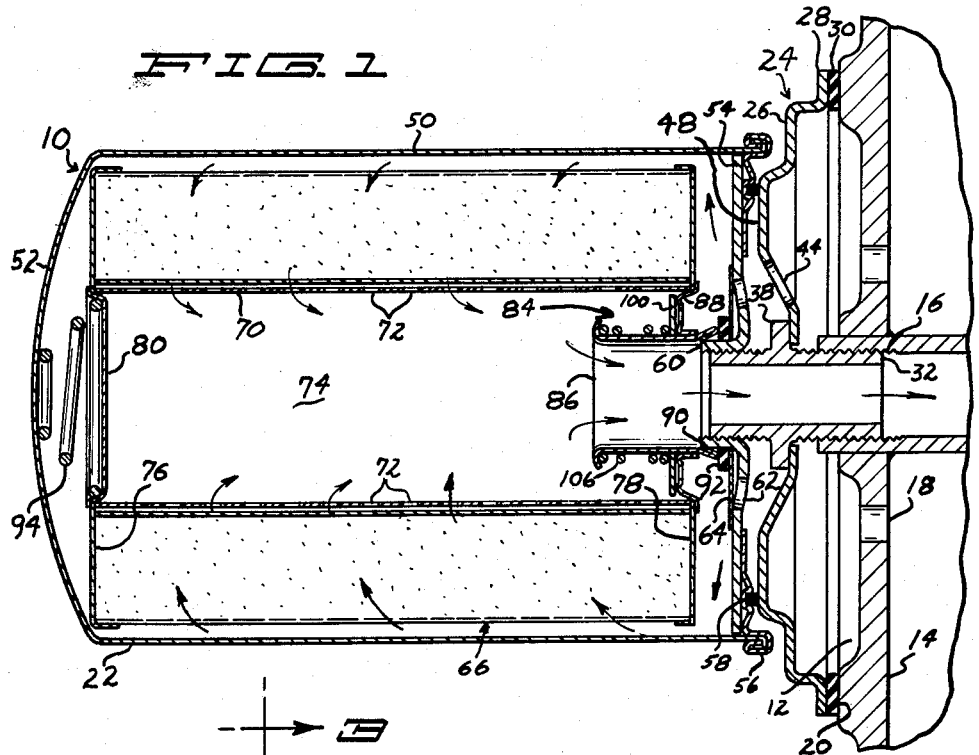

This invention relates generally to filters and particularly to filters which may be employed to filter lubricating oil of an internal combustion engine or the like.

A filter placed in the oil line of an internal combustion engine removes the grit and other impurities from the oil thereby providing improved engine operation. After the filter has been in the line a length of time the accumulation of grit, etc., provides increasing resistance to oil flow until a predetermined pressure is built up across the filter. At this point a pressure sensitive valve is actuated to bypass the filter element. This invention provides a filter suitable for use in such engines which has an improved bypass valve ensuring valve operation only at the predetermined pressure differential.

Accordingly, it is an object of this invention to provide a new and improved oil filter having an annular bypass valve adapted to bypass the lubricating oil from an inlet port to an outlet port, the valve having a recess interposed between a valve member and a ported member in such a manner as to provide increased pressure responsive area for operating the valve over and above the area presented to the inlet or high pressure side of the valve member by the ports in the ported member.

The present invention embodies certain improvements over the filter disclosed in our copending application Serial No. 700,025, filed December 2, 1957.

These and other more detailed and specific objects will be disclosed in the course of the following specification, reference being had to the accompanying drawing, in which—

FIG. 1 is a longitudinal sectional view showing our improved filter applied to an engine and in circuitous relation to the oil circulation system thereof.

FIG. 2 is an enlarged end elevational view of the bypass unit as seen from the right in FIGS 1 or 3.

FIG. 3 is a diametrical sectional view on line 3—3 in FIG. 2.

Referring to the drawing more particularly and by reference characters, 10 designates the filter unit proper, shown in FIG. 1 as being mounted on an adaptor 24, which in turn is secured against the outer surface 12 of wall 14 of the engine block. The wall 14 has an internally threaded opening 16 for receiving oil from the filter and a series of ports 18 disposed about opening 16 for supplying oil to the filter. The adaptor 24 comprises a dished plate 26 having an outer flange 28 sealed by gasket 30 against an annular seating surface 20 of wall 14. A nipple or bushing 32 has one threaded end extending through plate 26 for screwing into opening 16, while the opposite end is threaded to screw into the end plate 54 of filter casing 22 whereby the latter may be turned into engagement with the adaptor plate, a gasket 58 being interposed to effect a tight seal. The nipple has a flange 38, preferably non-circular so it can be turned by a wrench, which tightly clamps plate 26 to the wall 14. Plate 26 has one or more holes 44 through which oil passes from ports 18 to the filter, and after being filtered the oil returns through nipple 32 to the engine block.

Casing 22 includes a cylindrical wall 50 with integrally formed end wall 52 at one end thereof. End plate 54 at the opposite end is retained by an annular ring 56 which is crimped to the cylindrical wall 50. It is understood that any other suitable means of attaching end plate 54 to wall 50 may be used. Ring 56 is also adapted to retain an annular gasket 58 for engaging seat 48 of adaptor 24 for providing an oil seal between casing 22 and adaptor 24.

End plate 54 is provided with a plurality of inlet ports 62 spaced radially outwardly from nipple 32. As shown inlet ports 62 are preferably closed with a flexible check valve disk 64 which readily opens to admit oil to filter casing 22 but which is effective to prevent a reverse or back flow of oil through ports 62.

A tubular filter cartridge 66 formed of suitable filtering material is disposed coaxially within cylindrical wall 50. This cartridge includes an inner sleeve or lining 70 having a plurality of openings 72 adapted to pass oil from the cartridge to the inner cavity 74 thereof. A pair of imperforate end walls 76 and 78 close the opposite ends of the filter cartridge body proper, while a disk 80 closes one end of the cavity 74.

The oil passing into casing 22 through ports 62 moves radially outwardly from the valve disk 64 and thence longitudinally through the annular space between the wall 50 and cartridge 66. The oil then filters through the cartridge and into cavity 74, from whence it returns through sleeve 86 and nipple 32 to the engine block as previously noted.

As shown in FIG. 1 the right hand end of cartridge 66 is provided with a combined bypass valve and oil outlet unit 84. This unit includes the outlet sleeve or conduit 86 which is of smaller diameter than and extends coaxially within lining 70. The sleeve 86 is mounted in and extends through a disk or ported member 88 and has a flared end 90 seated against a gasket 92 encircling flange 60 of plate 54 and holds valve disk 64 in place. A spring 94, between wall 52 and disk 80, urges cartridge 66 to the right, as shown in FIG. 1, and this pressure holds flange 90 in sealing contact with gasket 92.

During normal engine operation as the device continues to filter the oil an accumulation of grit and other impurities provide increased resistance to oil flow through filter cartridge 66 and thus may sufficiently reduce the oil flow to do damage unless full circulation is promptly restored. Since the rate of oil flow through the filter may be measured by the pressure differential provided across or through the cartridge 66, suitable bypass means are provided to bypass the cartridge upon an excessive build-up of pressure differential.

The bypass valve unit 84 has a circular valve plate 100 which is normally held closed against ported member 88 by a spring 106, but which will open when subjected to sufficient pressure for permitting oil to flow from ports 62 through the valve and thence into sleeve 86 and back to the engine block without passing through cartridge 66.

The filter and bypass structure as thus far described is substantially identical with the corresponding disclosure found in our copending application Serial No. 700,025. It will be noted, however, that in our previous device valve member 100 closed flat against the adjacent surface of the ported disk 88. This was found objectionable under certain circumstances because when the valve was closed the valve ports 110 limited the total area of member 100 exposed to the oil to the combined cross sectional sizes of the ports themselves, while after the valve had been opened the entire port side area of the member 100 was exposed to pressure. Under these circumstances the valve spring 106 provided greater relative resistance to initial opening of the valve than it did after the valve member had become even only slightly spaced from the ported member.

In the present invention this objection has been obviated so that the valve spring 106 exerts a substantially uniform relative resistance to the oil pressure at all times. This has been accomplished by providing the annular ported member 88 with a pair of radially spaced annular ribs or shoulders 102 and 104, respectively disposed radially inwardly and outwardly of valve ports 110. These ribs or shoulders are arranged to act as stops for valve member 100 before the latter can reach surface contact with the intermediate or ported portion of the member 88.

The actual spacing 114 between these surfaces may be very small, and in fact is exaggerated in the drawing over what has been found sufficient in practice. In any event, it will be seen that since substantially the entire surface of the port side of member 100 is at all times exposed to the oil under pressure from ports 110 the relative resistance presented by the spring 100 is practically uniform at all times, without either increasing the size of valve ports 110 or otherwise altering what has been found to be a very practical and successful filter.

It is understood that suitable modifications may be made in the structure as disclosed, provided such modifications come within the spirit and scope of the appended claim. Having now therefore fully illustrated and described our invention, what we claim to be new and desire to protect by Letters Patent is:

In a filter having a housing provided with inlet and outlet ports at one end thereof and a filter element within the housing to filter fluid passing between the ports, a normally closed bypass valve disposed in the housing and being operative when subjected to predetermined pressure to bypass fluid between the ports without it passing through the filter element, said bypass valve being located near the inlet and outlet ports of said housing adjacent said one end of said filter element and comprising a sleeve disposed axially of said housing, a fixed ported member on said sleeve, a bodily movable circular valve member on said sleeve having a surface in juxtaposition with the ported member, means on said sleeve member yieldably urging the valve member toward the ported member to close the valve, said valve member being planar and said ported member having radially spaced annular seat portions normally engaging the valve member and a plane portion intermediate the seat portions parallel with the valve member and in spaced relation thereto in the closed position of the valve, and ports in said plane portion of a diameter less than the width of said plane portion.

References Cited in the file of this patent

UNITED STATES PATENTS

| | | |
|---|---|---|
| 611,667 | Watson | Oct. 4, 1898 |
| 1,821,082 | Tyler | Sept. 1, 1931 |
| 2,311,320 | Williams | Feb. 16, 1943 |
| 2,598,322 | Vokes | May 27, 1952 |
| 2,617,535 | Hamilton | Nov. 11, 1952 |
| 2,770,368 | Tischer | Nov. 13, 1956 |
| 2,884,133 | Walulik | Apr. 28, 1959 |